United States Patent [19]
Shin et al.

[11] Patent Number: 5,598,334
[45] Date of Patent: Jan. 28, 1997

[54] SYSTEM FOR DETERMINING AN ABNORMAL OPERATING CONDITION IN SPEED RATIOS OF AN AUTOMATIC TRANSMISSION AND A METHOD THEREFOR

[75] Inventors: Myungshin Shin; Heejun Kim, both of Kyungki-do, Rep. of Korea

[73] Assignee: Hyundai Motor Company, Seoul, Rep. of Korea

[21] Appl. No.: 366,774

[22] Filed: Dec. 30, 1994

[30] Foreign Application Priority Data

Dec. 30, 1993 [KR] Rep. of Korea ............... 93-31247

[51] Int. Cl.[6] .................. F16H 61/12; B60K 41/10
[52] U.S. Cl. .................. 364/424.08; 74/731.1
[58] Field of Search .............. 364/424.1, 424.05; 74/866; 192/0.073; 477/110

[56] References Cited

U.S. PATENT DOCUMENTS

| | | | |
|---|---|---|---|
| 4,523,281 | 6/1985 | Noda et al. ................ | 364/424.1 |
| 4,635,508 | 1/1987 | Tatsumi ................... | 74/866 |
| 4,702,127 | 10/1987 | Cote ....................... | 74/866 |
| 4,833,613 | 5/1989 | Mack et al. ................ | 364/423.05 |
| 4,835,694 | 5/1989 | Yamamoto et al. ........... | 364/424.1 |
| 4,843,551 | 6/1989 | Milunas .................... | 364/424.1 |
| 4,945,484 | 7/1990 | Cote et al. ................. | 364/424.1 |
| 4,947,329 | 8/1990 | Benford et al. .............. | 364/424.1 |
| 4,965,735 | 10/1990 | Holbrook et al. ............ | 364/424.1 |
| 5,016,174 | 5/1991 | Ito et al. ................... | 364/424.1 |
| 5,088,353 | 2/1992 | Yoshida .................... | 74/866 |
| 5,157,607 | 10/1992 | Stainton et al. ............. | 364/424.1 |
| 5,167,311 | 12/1992 | Satoh et al. ................ | 192/0.073 |
| 5,498,195 | 3/1996 | White et al. ................ | 477/110 |

*Primary Examiner*—Kevin J. Teska
*Assistant Examiner*—Russell W. Frejd

[57] ABSTRACT

The present invention discloses a system and a method for easily determining an abnormal operating condition in speed ratios of an automatic transmission by checking a speed ratio that does not perform normally and the condition of the system connected to the speed ratio, if the automatic transmission does not operate normally. The inventive system for determining an abnormal operating condition in speed ratios of an automatic transmission of an automotive vehicle includes a shift lever position sensing member, a turbine rotating frequency sensing member, an output shaft rotating frequency determination, a transmission oil temperature sensing device, a shift controlling member, and a data storing and information display device.

7 Claims, 5 Drawing Sheets

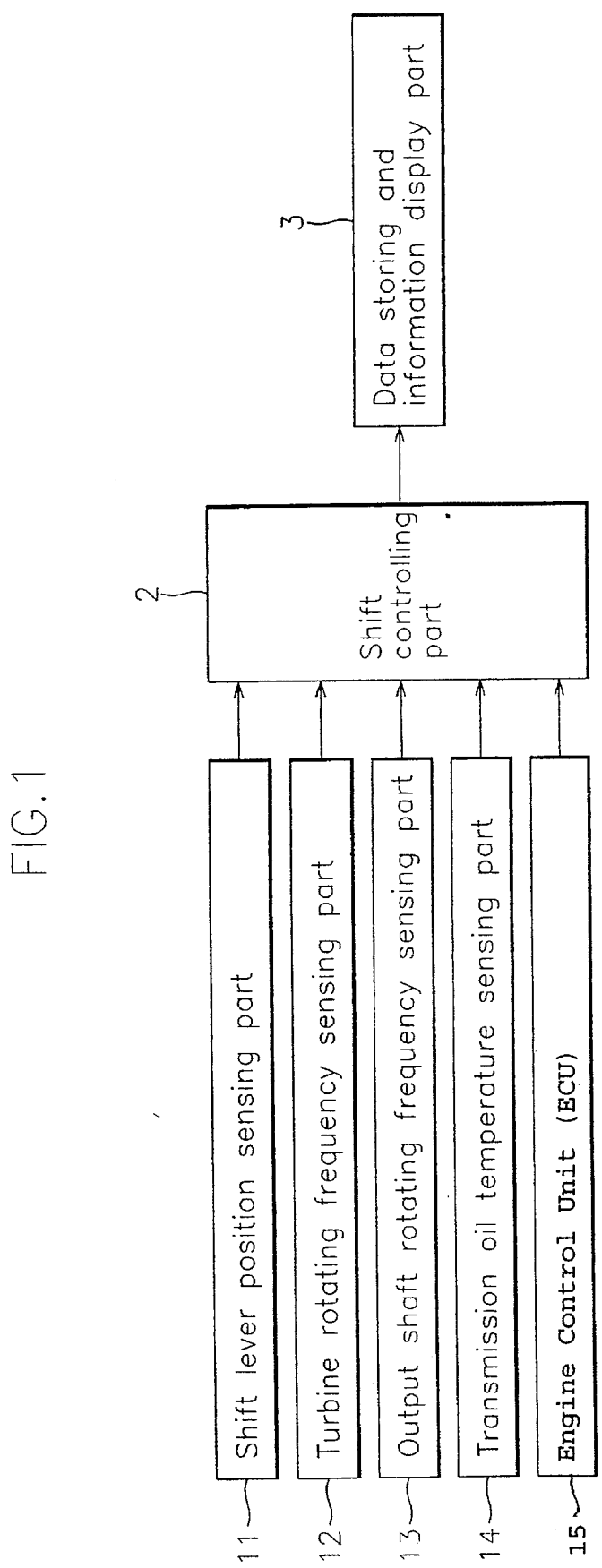

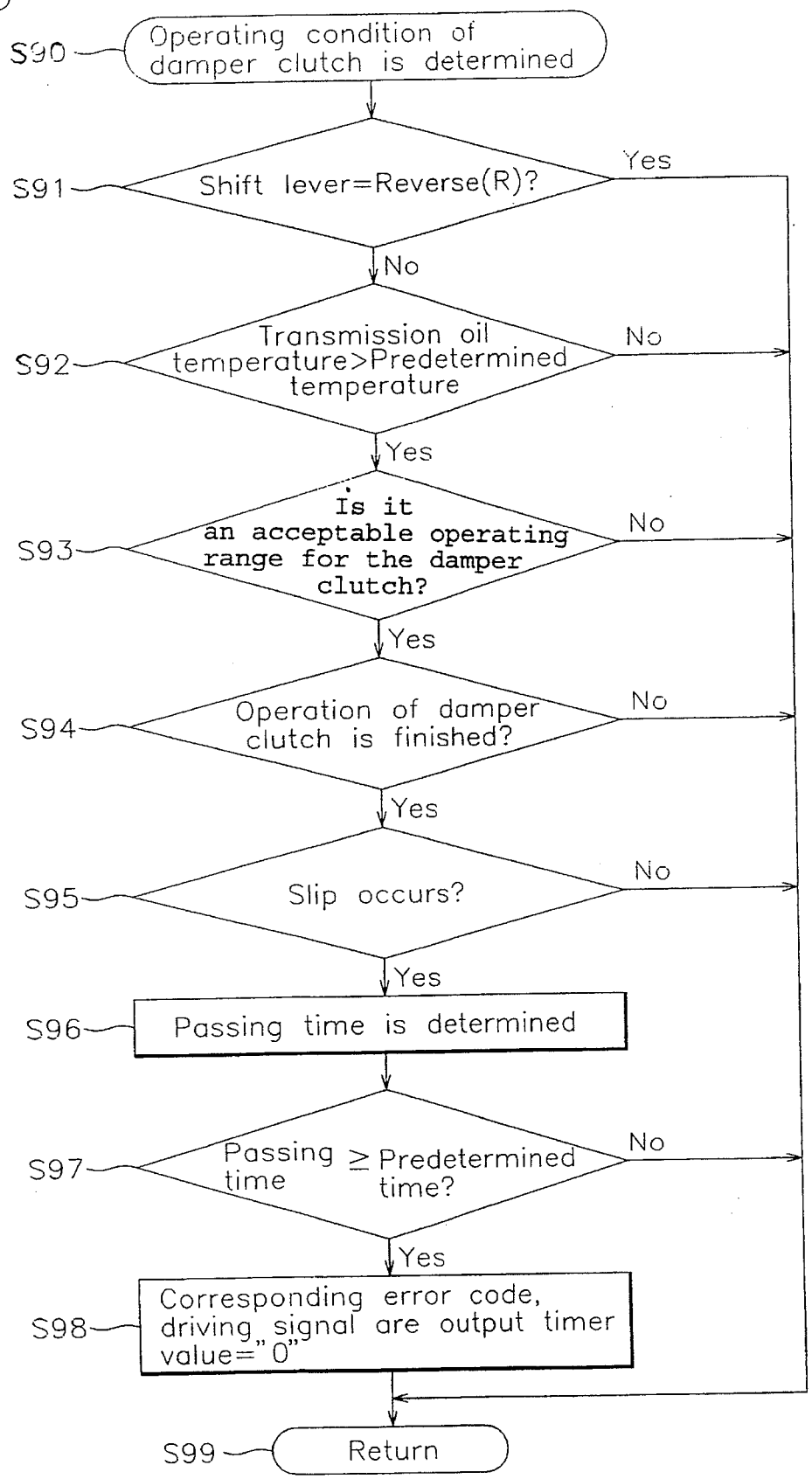

SYSTEM FOR DETERMINING AN ABNORMAL OPERATING CONDITION IN SPEED RATIOS OF AN AUTOMATIC TRANSMISSION AND A METHOD THEREFOR

BACKGROUND OF THE INVENTION

1. Field of the Invention

The present invention relates to a system and a method for determining an abnormal operating condition in the speed ratios of an automatic transmission. More particularly, the present invention relates to a device and a method for determining an abnormal operating condition in the speed ratios of an automatic transmission that can easily sense a mechanical problem with the automatic transmission.

2. Description of Related Art

Generally, an automotive vehicle including an automatic transmission may control the flow of fluid within a speed ratio range that is predetermined according to the running speed of the vehicle to automatically shift a transmission gear to a desired speed ratio.

That is, a torque converter uses power produced by an engine to control the torque of the fluid. The fluid acts on a valve corresponding to a control signal supplied from a transmission control device to operate the transmission gear according to the operating state of the vehicle.

In an automotive vehicle having such an automatic transmission, operation of a clutch pedal for cutting off power from the engine is not necessary to vary the transmission gears being in mesh. Since the engine stall by a driver's misoperation and poor driving capability does not occur, even a beginner may easily drive a car.

An automatic transmission, having speed ratios that vary considerably depending on the running condition of the vehicle has an exceedingly complicated structure. Thus, where an abnormal operating condition occurs somewhere in the transmission and a normal shift operation is not performed, a lot of time and effort is required to find the exact problem in the system and repair it.

Conventionally, if the automatic transmission does not operate normally, the transmission is replaced with a new one instead of performing a repair. Thus, this causes a financial burden to a driver.

SUMMARY OF THE INVENTION

The present invention addresses the above problems.

It is an object of the present invention to provide a system and a method for easily determining an abnormal operating condition in an automatic transmission by monitoring the speed ratios of the automatic transmission and comparing them with theoretical speed ratios for a variety of different operating conditions.

As an aspect of the present invention, a system for determining an abnormal operating condition in speed ratios of an automatic transmission of an automotive vehicle, comprises:

shift lever position sensing means for sensing a set position of a shift lever and outputting a signal;

turbine rotating frequency sensing means for sensing the rotating frequency of a turbine used as an input axle of the transmission and outputting a signal;

output shaft rotating frequency sensing means for sensing the rotating frequency of an output shaft connected to an output axle of the transmission and outputting a signal;

transmission oil temperature sensing means for sensing the temperature of the transmission oil filling the transmission and outputting a signal;

shift controlling means for determining whether shifting to a desired speed ratio is being performed, provided all the devices and signals relating to the operation of the transmission are in a normal condition, the automotive vehicle is in drive by a signal applied from the output shaft rotating frequency sensing means and the speed ratio is set in the drive position by a signal applied from the shift lever position sensing means, and determining if an abnormal operating condition occurs during a shifting operation, provided shifting to the desired speed ratio is being performed and then outputting an error code and a sensing signal corresponding to the condition in case the abnormal operating condition occurs, and outputting an error code and a sensing signal corresponding to the condition, provided the operation of the corresponding speed ratio is not determined to be normally performed after the shifting operation has been finished, and outputting an error code and a sensing signal corresponding to the condition, provided the operation of the damper clutch is not determined to be normally performed; and data storing and information display means connected to the shift controlling means, for storing error codes applied to the respective address, and operating an information display device in response to each of the applied sensing signals.

As another aspect of the present invention, a method for determining an abnormal operating condition of speed ratios of an automotive transmission comprises the steps of:

determining by means of a signal applied from an output shaft rotating frequency sensing means if an automotive vehicle is driving, all the devices and signals relating to the operation of the transmission being in a normal condition;

determining if shifting to a desired speed ratio is performed if a speed ratio is set in a drive position by a signal applied from the shift lever position sensing means;

outputting a corresponding error code and sensing signal in case an abnormal operating condition is determined to occur during shifting to a desired speed ratio;

outputting an error code and a sensing signal in response to a case that shifting is finished and the operating condition of the corresponding speed ratio is determined to be normal; and outputting an error code and a sensing signal in response to a case that the operating condition of the damper clutch is not normal.

BRIEF DESCRIPTION OF THE DRAWINGS

FIG. 1 is a block diagram of a system for determining an abnormal operating condition in speed ratios of an automatic transmission in accordance with a preferred embodiment of the present invention; and FIGS. 2A to 2D are operation Sequences of a method for determining an abnormal operating condition in speed ratios of an automatic transmission in accordance with a preferred embodiment of the present invention.

DETAILED DESCRIPTION OF THE PREFERRED EMBODIMENT

Figure 2A:
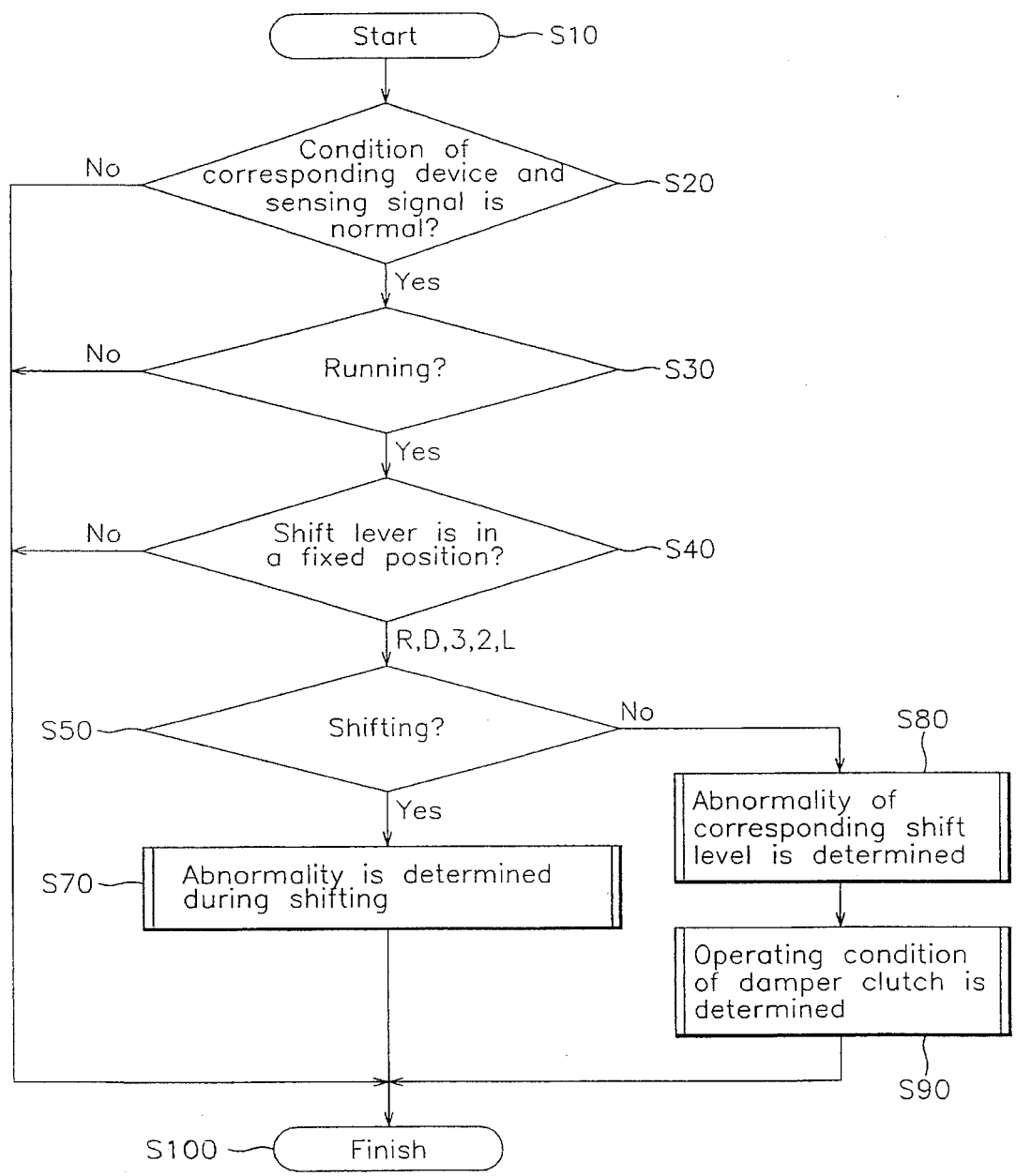

The present invention will now be described in detail with reference to the accompanying drawings.

As shown in FIG. 1, the system for determining an abnormal operating condition in speed ratios of an automatic transmission in accordance with the present invention includes: a shift lever position sensing part 11 for sensing the set position of a shift lever and outputting a signal; a turbine rotating frequency sensing part 12 for sensing the rotating frequency of a turbine used as an input axle of the transmission and outputting a signal; an output shaft rotating frequency sensing part 13 for sensing the rotating frequency of an output shaft connected to an output axle of the transmission; a transmission oil temperature sensing part 14 for sensing temperatures of an oil which fills the transmission; a shift controlling part 2 for sensing the operating state of each speed ratio by inputting a signal supplied from the sensing parts 11 to 14 and an engine rotational frequency signal applied from an engine controlling unit (ECU) 15 and for outputting an error code corresponding to the operating state and a driving signal for driving an information display device; and a data storing and information display part 3 connected to the shift controlling part 2 which stores error codes for determining an abnormal operating condition and operating an information display device in response to an applied driving signal.

The following description details the operation of the system for determining an abnormal operating condition from the speed ratios of the automatic transmission in accordance with a preferred embodiment of the invention.

Referring to FIGS. 2A to 2D, the overall control operation of the shift controlling part 2 is described.

Once power is applied to start the operation of the shift controlling part 2 (S10), the shift controlling part 2 determines at S20 whether each device is performing normally.

That is, the shift controlling part 2 senses (1) whether or not the shift lever position sensing part 11 is normally operated since sensing devices such as inhibit switches vary exactly according to the set position of the shift lever, (2) whether or not each solenoid valve used in the automatic transmission is normally operating, (3) whether or not the rotating frequency sensing signal of the engine is normally applied from the ECU, and (4) whether or not the rotation frequency sensing part 13 of the output shaft is normally operating to produce a signal.

If any one of the above-mentioned devices or signals is not in a normal condition, the shift controlling part 2 does not perform the abnormality determining operation of the automatic transmission but finishes the operation (S100).

Where all of the devices or signals are in a normal condition, the shift controlling part 2 determines the rotating frequency of the output shaft directly connected to the driving axle of the vehicle in accordance with a signal supplied from the output shaft rotating frequency sensing part 13, and determines at S30 whether the vehicle is running.

If the vehicle stops or is parked, the shift controlling part 2 does not perform the abnormality determining operation but finishes the operation (S100).

If the vehicle is running at corresponding speeds, the shift controlling part 2 senses (S40) the position of the shift lever set by a driver by means of the signal supplied from the shift lever position sensing part 11. If the shift lever is not in a forward position, D, 3, 2, L, or R but in neutral N or park P, since the shift controlling part 2 cannot determine the operating state of the automatic transmission, the transmission does not perform the determination of abnormality and finishes the operation (S100).

However, if the shift lever is in a fixed position D, 3, 2, L, or R, the shift controlling part 2 determines at S50 whether a speed ratio is being shifted to a desired speed ratio by the change of the vehicle running condition within a predetermined range by the position of the set shift lever. The shift controlling part 2 compares the present value with the previous value of the predetermined variable stored in a corresponding address of the internal memory of the shift controlling part 2 for making the determination for step 350.

The above predetermined variable is changed to a value corresponding to a predetermined speed ratio, once a desired speed ratio suited to the running condition of the vehicle is predetermined, and the shift control part 2 may determine the position of the speed ratio now in gear.

If the value of the previous variable is the same as that of the present variable, and the desired variable is different from that of the present variable, shifting to the other desired speed ratio is performed.

If the present speed ratio is shifted to another speed ratio, control of the shift controlling part 2 is transferred (S70) to a sub-routine for determining whether an abnormal operating condition occurs during shifting. If a certain speed ratio is being set without shifting, control of the shift controlling part 2 is transferred to a sub-routine for determining an abnormal operating condition of the corresponding speed ratio to carry out the action (S80). When the above step (S80) is finished, control of the shift controlling part 2 is transferred to a sub-routine for determining the operating condition of the damper clutch and determines at S90 whether the damper clutch is normally operating without slippage and finishes the operation (S100).

The shift controlling part 2 conclusively determines the operating condition of the automatic transmission via the operation of each sub-routine S70 to S90.

Figure 2B:
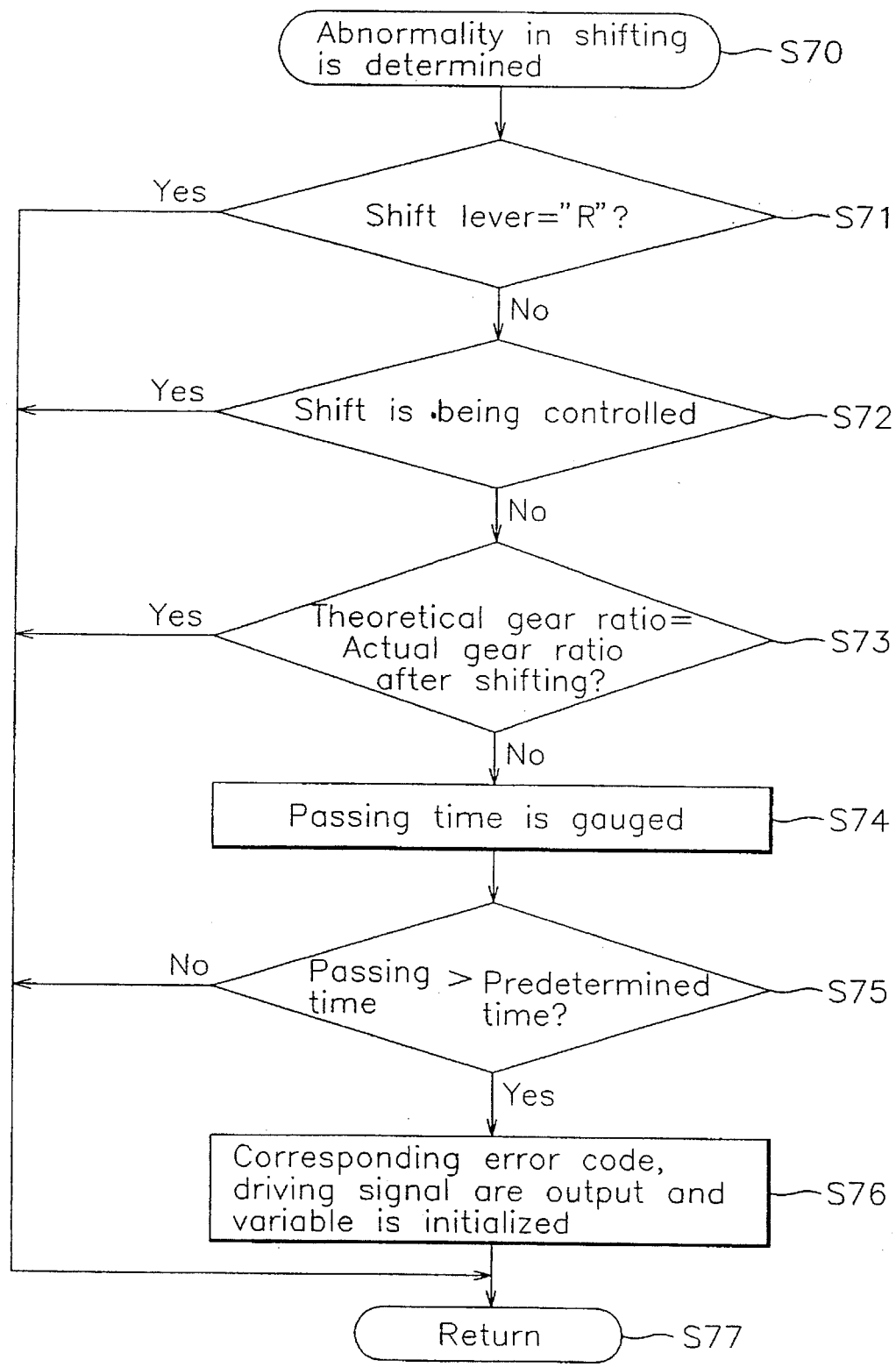

The operation of the sub-routine S70 for determining whether the shifting is normally performed, is described referring to FIG. 2B.

As the sub-routine S70 starts, the shift controlling part 2 determines at S71 whether or not the position of the shift lever is set at a reverse position. There is just one desired speed shift for reverse operation without speed variable ratio. If reverse is detected, control of the shift controlling part 20 is returned to the main program (S77).

However, if the set position of the speed ratio is another driving stage (D, 3, 2, or L) other than "R" the shift controlling part 2 determines at S72 whether or not shifting is performed at the desired speed ratio. The shift controlling part 2 determines whether or not a controlling signal is being produced for varying the operating condition of the respective solenoid valves in order to vary the condition to a desired speed ratio.

The shift controlling part 2 reads a value of the corresponding variable that may vary according to the corresponding solenoid valve, and determines whether the solenoid valve is operated to be in mesh with the corresponding desired speed ratio or if the operation of the corresponding solenoid valve is finished to shift to a desired speed ratio.

If the corresponding solenoid valve is operated, the shift controlling part 2 does not determine the operating condition of the corresponding transmission until the shifting is finished and returned to the main program at S77.

However, if the operation of the corresponding solenoid valve for controlling hydraulic pressure is finished, the shift controlling part 2 determines at S73 whether or not a theoretical gear ratio already predetermined corresponding to the desired speed ratio by the value of the variable, is the same as a gear ratio according to the operation of the corresponding speed ratio after the completion of the shifting operation.

However, if the operation of the corresponding solenoid valve for controlling hydraulic pressure is finished, the shift controlling part 2 determines at S73 whether a theoretical gear ratio already predetermined corresponding to the desired speed ratio by the value of the variable, is the same as a gear ratio according to the operation of the corresponding speed ratio after completion of the transmission operation.

To obtain a corresponding gear ratio according to the operating condition of the speed ratio, the shift controlling part 2 computes an actual input/output gear ratio by means of the rotating frequency of the output shaft connected to the driving axle via the speed ratio determined by a signal applied from the turbine rotating frequency sensing part 12.

If a theoretical gear ratio corresponding to the speed ratio and an actual gear ratio according to the turbine rotating frequency and output shaft rotating frequency are the same as each other, the shift controlling part 2 determines that the automatic transmission is in exact mesh with the corresponding speed ratio and returns to the main program at S77.

However, if the theoretical gear ratio differs from the actual gear ratio, the shift controlling part 2 determines if the automatic transmission is not in exact mesh with the corresponding speed ratio due to the abnormal operating condition, or if the operation of the parts related to the hydraulic pressure are performing normally.

Subsequently, at S74 the shift controlling part 2 checks the time in which the abnormality occurs and determines at S75 if that time exceeds a predetermined abnormality determining time limit.

As mentioned above, if the continuous time when the theoretical ratio differs from the actual gear ratio exceeds the abnormality determining time, the shift controlling part 2 determines it as an abnormal condition due to an instantaneous error malfunction by noise or the like, and does not produce an error code and returns to the main program at S77.

However, if the continuous time when the theoretical ratio differs from the actual gear ratio exceeds the abnormality determining time, the shift controlling part 2 determines it as an abnormal condition due to an abnormal operating condition in a corresponding clutch or the parts relating to the hydraulic pressure. The shift controlling part 2 outputs at S76 to the data storing and information display part 3 a driving signal for driving a corresponding information display device that has already been set according to an error code predetermined by a previous desired speed ratio and the present speed ratio and the corresponding shifting operation.

The data storing and information display part 3 stores an error code supplied from the shift controlling part 2, and operates the information display device by a driving signal supplied to easily determine an abnormal operating condition and causes for abnormality from the outside.

The error code stored in the data storing and information display part 3 receives a different value predetermined respectively by the previous desired speed ratio and the present speed ratio such as each first speed ratio to second speed ratio, or third speed ratio to fourth speed ratio so that, by means of the error code, a driver may determine from which speed ratio to which speed ratio the abnormal operating condition has occurred in the middle of the shifting operation.

Through the above operation, in case the normal shifting operation is not performed due to the abnormal operating condition, a ground man checks the operating condition of each corresponding device engaged with the corresponding shifting operating, by means of the operating condition of the data storing and information display part 3.

Figure 2C:
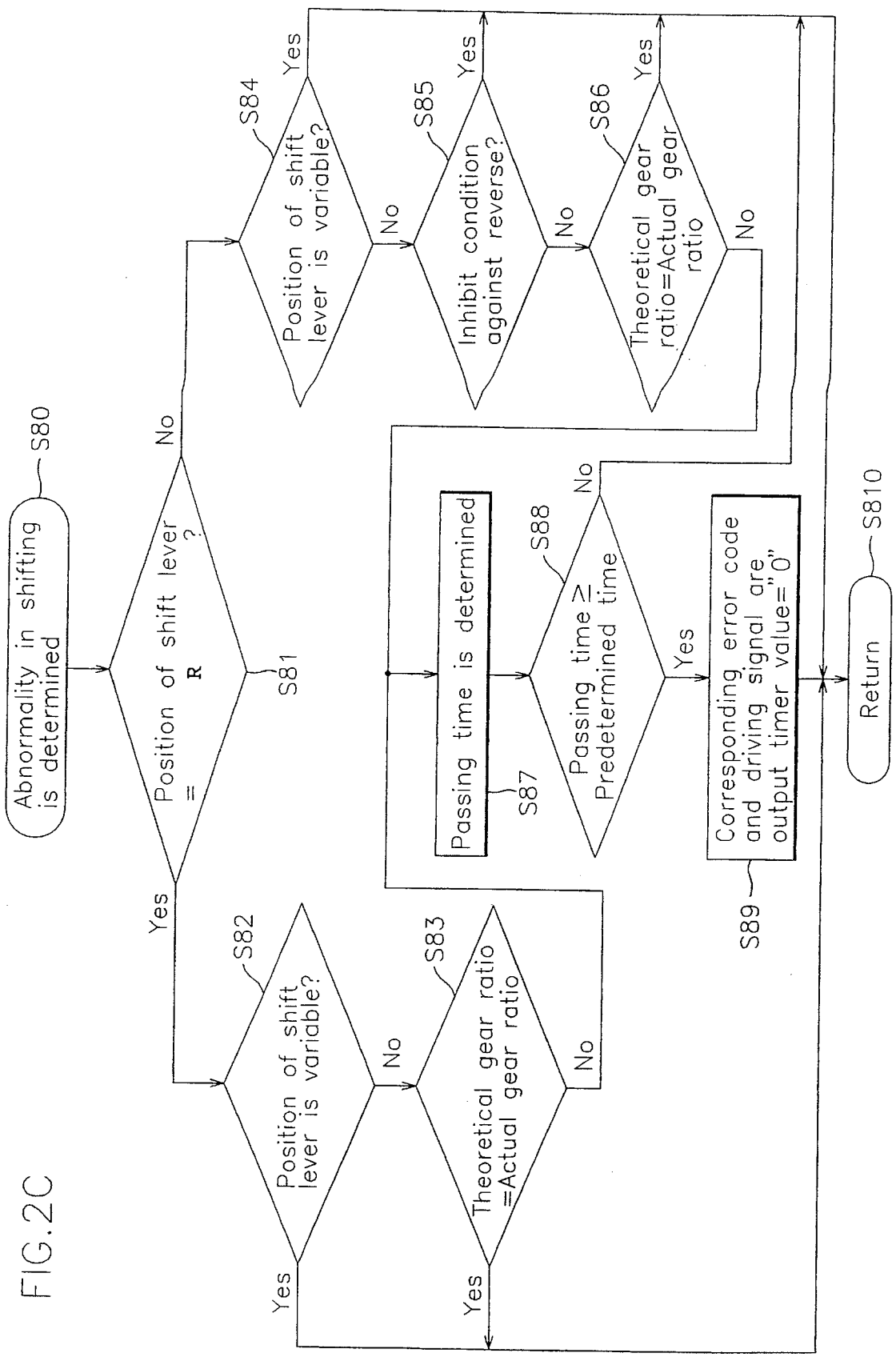

After the shifting has been completed, the shifting controlling part 2 determines that the operating condition of the speed ratio is now in mesh via the operation of the sub-routine S80 as shown in FIG. 2C.

First, the shift controlling part 2 determines at S81 whether the shift lever is now in an R position by means of the signal applied from the shift lever position sensing part 11.

If the shift lever is not in the R position, the shift controlling part 2 determines at S82 whether the set position of the shift lever is the same as the previous one. If the previous set position of the shift lever is not the same as the present one, the position of the corresponding speed ratio varies and the shift controlling part 2 returns to the main program (S810).

However, if the set position of the shift lever does not vary and is the same as the previous set position, the shift controlling part 2 determines at S83 whether an actual gear ratio computed by a signal applied from the turbine rotating frequency sensing part 12 and the output shaft rotating frequency sensing part 13, is the same as a theoretical gear ratio that is predetermined corresponding to the speed shift now in mesh.

If the theoretical gear ratio is the same as the actual gear ratio computed by means of the rotating frequency of the turbine and of the rotating frequency of the output shaft, the shift controlling part 2 determines that the automatic transmission is exactly in mesh with a desired speed ratio corresponding to the condition of the vehicle and the automatic transmission performs a normal operation, and returns to the main program at S810.

However, if the theoretical gear ratio is not the same as the actual gear ratio, the shift controlling part 2 determines that the operation of the speed ratio is not performed normally, and at S87 gauges the passing time when the abnormal operating condition continues and then compares at S88 this actual time with the predetermined time.

Returning to S81, if the position of the shift lever is "R" then control shifts to S84. At S84, the same process is executed as at S82. If the position of the shift lever is not variable, then S85 is executed.

The inhibit condition against reverse controls the shift controlling part 2 so as not to perform a reverse when the shift lever is misoperated and a signal for reverse that is unsuitable for the present driving condition is applied to select the R position, regardless of the intention of the driver, thereby protecting the automatic transmission as well as ensuring a safe driving operation.

If the inhibit condition against reverse occurs, the shift controlling part 2 determines that the set position of the shift lever is determined by mistake, and returns to the main program at S85.

However, if the inhibit condition against reverse does not occur, the reverse is now performed, and the shift controlling part 2 determines at S86 if a theoretical gear ratio corresponding to the reverse is the same as an actual gear ratio computed via the reverse, and returns to the main program at S810.

However, if the theoretical gear ratio is not the same as the actual gear ratio, the shift controlling part 2 determines at S86 that a theoretical gear ratio corresponding to the reverse stage R and an actual gear ratio are the same as each other.

If the theoretical gear ratio is the same as the actual gear ratio, the shift controlling part 2 determines that the reverse is normally performed and then returns to the main program (S810). If the theoretical gear ratio differs from the actual gear ratio, the shift controlling part 2 determines that the shifting operation on the reverse position is not smoothly performed and gauges at S87 the time during which the abnormal operating condition continues in order to compare at S88 a predetermined time with the actual time.

If the abnormal operating condition results in a passing time that exceeds or is equal to the predetermined time, the shift controlling part 2 outputs at S89 to the data storing and information display part 3 a driving signal operating each corresponding error code and information display device, and the information display device is operated, simultaneously with storing the error code in the memory.

If the passing time associated with the abnormal operating condition continues does not exceed the predetermined time, the shift controlling part 2 determines the state as a temporary abnormal operating condition, and then returns to the main program at S810. The value of the error code varies by the position of the desired shift stage now in mesh, and a user checks just the operating condition of a device linked with the operation of a speed ratio according to a value of the error code to determine the cause of the malfunction.

Referring now to FIG. 2D, the description of the damper clutch is described.

Using a signal applied from the shift lever position sensing part 11, the shift controlling part 2 determines at 591 if the shift lever is in the R position. In case the shift lever is in the R position, the damper clutch is not operated, and the shift controlling part 2 returns to the main program at 599.

However, if the shift lever is in the D, 3, 2 or L positions (a position other than the reverse position), the shift controlling part 2 reads a signal applied from the transmission oil temperature sensing part 14 to compare the determined transmission oil temperature with a predetermined temperature at S92.

If the temperature of the transmission oil is lower than the predetermined temperature, the shift controlling part 2 determines that the operating condition of the engine is at a starting stage and returns to the main program, not determining the operating condition of the damper clutch at S99. If the temperature of the transmission oil determined by the signal applied from the transmission oil temperature sensing part 14 is higher than a predetermined temperature, the shift controlling part 2 determines if the transmission is at a normal condition in which the automotive vehicle may drive normally, and if the driving condition of the vehicle exists in a predetermined operating range for the damper clutch at S93.

If the driving condition of the vehicle does not exist in the operating range of the damper clutch, the shift controlling part 2 cannot determine the operating condition-of the damper clutch, and returns to the main program (S99).

However, if the driving condition of the vehicle corresponds to the predetermined Operating range of the damper clutch, the shift controlling part 2 determines if the operation of the damper clutch is finished by the change in hydraulic pressure using a control signal at S94.

In such a case, the shift controlling part 2 reads the value of a corresponding variable that varies with the operating condition of the damper clutch. If the operation of the damper clutch in the operating range of the damper clutch is not finished, the shift controlling part 2 returns to the main program at S99. If the operation of the damper clutch is finished, the shift controlling part 2 determines if the transmission is normally operating without slippage, by means of an engine rotating frequency sensing signal applied from the ECU and a signal applied from the turbine rotating frequency sensing part 12 at S95.

The damper clutch is a device for transmitting dynamic force of the engine to the turbine not via the torque inverter in order to prevent a loss of the dynamic force of the engine by operation of the torque converter of the automatic transmission. If the rotating frequency of the engine is the same as the rotating frequency of the turbine, the shift controlling part 2 determines that the operation of the damper clutch is normal without slippage and returns to the main program at S99.

However, if the rotating frequency of the engine is not the same as the rotating frequency of the turbine, the shift controlling part 2 determines that the loss of the dynamic force from the engine is produced because of slippage. If the damper clutch is determined to be in an abnormal operating condition, the shift controlling part 2 gauges its continuous time at S96 and compares it with a predetermined time at S97. If the passing time that the abnormal operating condition of the damper clutch continues exceeds or is equal to the predetermined time, the shift controlling part 2 determines that the damper clutch is in an abnormal operating condition, and then outputs an error code and a corresponding information display device driving signal to the data storing and information display 3 that can find out the abnormal operating condition of the damper clutch at S98 to store them in memory. The shift controlling part 2 operates the information display device that can determine the operating condition of the damper clutch and then returns to the main program at S99.

If the time the abnormal operating condition of the damper clutch continues but does not exceed or is equal to the predetermined time, the shift controlling part 2 assumes a temporary malfunction of the damper clutch and returns to the main program at S99. The value of the codes stored in the memory of the data storing part 3 allows a determination of the operating condition of the damper clutch, and if an abnormal operating condition occurs in the automotive transmission, the condition of the damper clutch is checked to facilitate checking for the causes of the abnormality.

The data storing part 3 stores an error code in an address in response to the abnormal operating condition by the operation of each speed ratio, and may drive the information display device predetermined by each error code to easily check the condition of each part of the vehicle from the outside.

Accordingly, using the value of the error codes stored in each address of the data storing part 3, it can be determined whether or not the abnormal operating condition occurs when shifting to a desired speed ratio, or the abnormal operating condition occurs after shifting to a desired speed ratio. In addition, in which speed ratio the abnormal operating condition occurs may be found, and by selecting just the operating condition of the clutch or corresponding solenoid valve relating to each shifting operation, the normal operating condition may be easily determined. The operating condition of the damper clutch may be simply determined by means of the error codes stored in the corresponding address of the data storing and information display part 3.

The repair may be finished by just replacing the corresponding part with a new one. Thus, the cost for repair of the automatic transmission and waste of the vehicle's components may be reduced.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A system for determining an abnormal operating condition in speed ratios of an automatic transmission of an automotive vehicle, comprising:

shift lever position sensing means for sensing a set position of a shift lever and outputting a shift lever position signal;

turbine rotating frequency sensing means for sensing the rotating frequency of a turbine used as an input axle of the transmission and outputting a turbine rotating frequency signal;

output shaft rotating frequency means for sensing the rotating frequency of an output shaft connected to an output axle of the transmission and outputting an output shaft rotating frequency signal;

means for determining a desired speed ratio from the shift lever position signal;

shift controlling means including,
means for determining whether or not a shifting operation to the desired speed ratio is being performed;
means for determining if an abnormal operating condition exists during a shifting operation by comparing the actual speed ratio calculated from the rotating frequency signal and the rotating frequency signal with the desired speed ratio;
means for outputting an error code and a sensing signal corresponding to the determined abnormal condition; and data storing and information display means connected to said shift controlling means, for storing error codes for a plurality of abnormal conditions, and operating an information display device in response to the error control and sensing signals from said output means corresponding to one of said stored plurality of abnormal conditions to enable an operator to identify a potential problem with a particular component of the transmission.

2. The system according to claim 1, said shift controlling means further comprises, means for comparing a theoretical gear ratio with a practical gear ratio calculated from the turbine rotating frequency signal and the output shaft rotating frequency signal for producing a gear ratio comparison signal, and means for outputting error codes to data storing and information display means responsive to the gear ratio comparison signal from said comparing means when the theoretical gear ratio differs from the practical gear ratio for a predetermined time.

3. The system according to claim 1, said shift controlling means further comprises:

means for sensing the temperature of the transmission oil filling the transmission and supplying a transmission oil temperature signal; and a damper clutch monitoring means for detecting an abnormal condition with respect to a damper clutch in the transmission wherein if the position of the shift lever determined by a signal applied from the shift lever position sensing means is not set at the reverse position, the temperature of the transmission oil determined by the transmission oil temperature signal applied from the transmission oil temperature sensing means is higher than a predetermined temperature and the present range is in a range such that the damper clutch in the transmission is operated by the running condition of the vehicle, when the operation of the damper clutch is finished, and the engine rotating frequency signal is not determined to be the same as the turbine rotating frequency signal, the shift controlling means outputs an error code in response to the abnormal operating condition of the damper clutch and a control signal to the data storing and information display device for displaying one of said plurality of abnormal conditions.

4. A method for determining an abnormal operating condition of speed ratios of an automotive transmission comprising the steps of:

determining the position of a shift level for the transmission using a shift lever position sensing means and producing a shift lever position signal;

determining the rotating frequency of a turbine used as an input axle of the transmission using a turbine rotating frequency means and producing a turbine rotating frequency signal;

determining the rotating frequency of an output shaft connect to an output axle of the transmission using an output shaft rotating frequency sensor and producing an output shaft rotating frequency signal;

determining by means of a signal applied from an output shaft rotating frequency sensing means if the transmission is in a normal condition;

determining a desired speed ratio from the shift lever position signal supplied from the shift lever position sensing means;

comparing if the desired speed ratio is equal to an actual speed ratio of the transmission calculated from the turbine rotating frequency signal and the output shaft frequency signal;

identifying an abnormal condition if the difference between the actual speed ratio and desired speed ratio exceeds a predetermined time as the transmission is operating;

if an abnormal condition is identified, outputting a corresponding error code and sensing signal for displaying a message reflecting the abnormal condition on a display for enabling an operator to diagnosis a defective part of the transmission which may be the source of the abnormal condition.

5. The method according to claim 3, wherein the method for determining an abnormal operating condition when shifting to said corresponding desired speed ratio is performed, further comprises the steps of:

determining whether or not the transmission is executing a shifting operation and if the shift lever is set in the reverse position;

if the transmission is not shifting and the shift lever is not in reverse, determining if a theoretical gear ratio for the desired speed ratio is the same as the practical gear ratio calculated from the turbine rotating frequency and output shaft frequency signals from the turbine rotating frequency sensing means and the output shaft rotating frequency sensing means; and outputting error codes for causing the display of an error message if the time of operation in which the difference between the theoretical gear ratio differs from the actual gear ratio exceeds the predetermined time.

6. The method according to claim 4, wherein the method for determining an abnormal operating condition when shifting to said corresponding desired speed ratio is performed, further includes the steps of:

determining if the shift lever is set in the reverse position from the shift lever position signal applied from the shift lever position sensing means;

determining if the previous set position of the shift lever is the same as the present set position of the shift lever if not in the reverse position;

determining if a theoretical gear ratio by the speed ratio is the same as an actual gear ratio by the turbine rotating frequency and output shaft rotating frequency signals applied from the turbine rotating frequency sensing means and output shaft rotating frequency sensing means, if the previous set position of the shift lever is the same as the present set position;

determining if a theoretical gear ratio by a desired speed ratio is is the same as an actual gear ratio by comparing the turbine rotating frequency and output shaft rotating frequency signals respectively applied from the turbine rotating frequency sensing means and the output shaft rotating frequency sensing means; and outputting an error code corresponding to the present desired speed ratio and a control signal for driving a corresponding information display device of a corresponding data storing and information display device.

7. The method according to claim 4, further comprising the steps of:

determining the operating condition of the damper clutch, including:

determining if the shift lever is set in the reverse position by means of the shift lever position signal applied from the shift lever position sensing means;

determining if the transmission oil temperature determined by a transmission oil temperature signal applied from a transmission oil temperature sensing means is higher than a predetermined temperature;

determining whether the engine rotating frequency determined by the engine rotating frequency sensing signal applied from the engine controlling device is the same as the turbine rotating frequency determined by a signal applied from the turbine rotating frequency sensing means, if the transmission oil temperature is higher than the predetermined temperature and the driving condition of the vehicle is determined to be in the operating range of the damper clutch, and the operation of the damper clutch is finished; and outputting an error code corresponding to an abnormal operating condition of the damper clutch and a control signal for driving a corresponding information display device of the corresponding data storing and information display device, if the engine rotating frequency and the turbine rotating frequency different from each other and exceed a predetermined time.

\* \* \* \* \*